United States Patent [19]
Hayashi et al.

[11] Patent Number: 5,904,757
[45] Date of Patent: May 18, 1999

[54] TRAP APPARATUS

[75] Inventors: Kazuichi Hayashi, Kofu; Yuichiro Fujikawa, Yamanashi-ken, both of Japan

[73] Assignee: Tokyo Electron Limited, Tokyo, Japan

[21] Appl. No.: 08/967,917

[22] Filed: Nov. 12, 1997

[30] Foreign Application Priority Data

Nov. 13, 1996 [JP] Japan .................................. 8-317124

[51] Int. Cl.$^6$ .................................................. B01D 45/08
[52] U.S. Cl. ........................... 96/416; 55/385.1; 55/423; 55/444; 55/445; 55/446; 55/481; 438/905; 438/909
[58] Field of Search ......................... 95/25, 272; 96/414, 96/415, 416, 417, 418, 419, 422; 55/442, 444, 445, 446, DIG. 34, 385.1, 385.2, 473, 456, 457, 423, 481; 438/905, 909

[56] References Cited

U.S. PATENT DOCUMENTS

| | | | |
|---|---|---|---|
| 1,088,187 | 2/1914 | Theisen | 55/446 |
| 1,653,203 | 12/1927 | Connally | 55/446 |
| 1,767,089 | 6/1930 | Miller et al. | 55/444 |
| 1,857,348 | 5/1932 | Bokenkroger | 55/446 |
| 2,290,323 | 7/1942 | Graham | 55/446 |
| 3,524,437 | 8/1970 | Crandall | 55/444 |
| 3,892,550 | 7/1975 | Riis | 55/446 |
| 4,740,220 | 4/1988 | Mark et al. | 55/446 |
| 4,832,715 | 5/1989 | Naruse | 55/446 |
| 4,835,114 | 5/1989 | Satou et al. | 438/905 |
| 5,039,321 | 8/1991 | Satoh et al. | 55/385.2 |
| 5,122,170 | 6/1992 | Satoh et al. | 55/385.2 |
| 5,211,729 | 5/1993 | Sherman | 55/319 |
| 5,246,881 | 9/1993 | Sandhu et al. | 434/909 |
| 5,247,610 | 9/1993 | Croker | 55/444 |
| 5,584,959 | 12/1996 | Kimura et al. | 156/345 |
| 5,584,963 | 12/1996 | Takahashi | 156/646.1 |
| 5,599,732 | 2/1997 | Razeghi | 437/105 |
| 5,788,747 | 8/1998 | Horiuchi et al. | 55/385.1 |

FOREIGN PATENT DOCUMENTS

2-61067  3/1990  Japan .

*Primary Examiner*—Duane S. Smith
*Attorney, Agent, or Firm*—Oblon, Spivak, McClelland, Maier & Neustadt, P.C.

[57] ABSTRACT

The trap apparatus of the present invention includes a case provided for a gas exhaust system used for a film forming equipment which carries out a film forming process on an object, a gas supply port, made in the case and connected to an exhaust pipe of the gas exhaust system, for introducing an exhaust gas flowing through the exhaust pipe, into the case, a gas exhaust port, made in the case and connected to an exhaust pipe of the gas exhaust system, for exhausting the exhaust gas flowing through an inner space of the case, to the exhaust pipe, a plurality of partition plates arranged in the case so as to partition the inner space of the case into a plurality of rooms between the gas supply port and the gas exhaust port, a gas distribution port provided in some of the partition plates such that the exhaust gas introduced into the case through the gas supply port, is allowed to flow through the rooms partitioned by the partition plates, in the order, and then exhausted from the gas exhaust port, and a trap mechanism housed in each of the rooms, for trapping reaction byproducts contained in the exhaust gas introduced into the case through the gas supply port.

10 Claims, 8 Drawing Sheets

TRAP APPARATUS

BACKGROUND OF THE INVENTION

The present invention relates to a trap apparatus for trapping reaction byproducts contained in an exhaust gas from a film forming equipment for carrying out a predetermined film forming process on an object, so as to eliminate them.

Generally, in the productions of integrated circuits such as ICs or logic elements, the film forming process for forming a predetermined thin film on an object such as a semiconductor wafer, a glass substrate or LCD substrate, and the etching process for etching a formed thin film into a desired pattern, are repeatedly carried out.

For example, in the film forming process, as a predetermined process gas is introduced into a reaction container, and the process gas reacts, a thin film of silicon, a thin film of a silicon oxide or a silicon nitride, a thin film of a metal, or a thin film of a metal oxide or a metal nitride, or the like is formed on a surface of an object. At the same time with the reaction of forming such a film, undesired reaction byproducts are created, which are discarded together with an exhaust gas.

The reaction byproducts, if directly released to the atmosphere, cause an environmental pollution or the like. Therefore, as a general case, a trap apparatus is provided for the gas exhaust system extending from the processing container, so as to eliminate the reaction byproducts contained in the exhaust gas by trapping them with the trap apparatus.

There are various types of trap apparatuses having different structures, proposed depending upon the characteristics of reaction byproducts to be trapped and eliminated. For example, the trap apparatus used for eliminating reaction products which are liquefied or solidified as a condensate at room temperature, is formed to have a structure consisting of a case having a supply port and an exhaust port, for exhaust gas, and a number of fins provided in the case. It should be noted that these fins are arranged in order each at a different angle with respect to the direction of flow of the exhaust gas, so as to create an exhaust conductance. With this structure, when the exhaust gas passes through the fins, the reaction byproducts contained in the exhaust gas are trapped as they are adhered to the surfaces of the fins.

Trap apparatuses of the conventional type as described above, usually have a single space structure. Due to such a structure, the time period in which the exhaust gas is brought into contact with the fins, is very short. Particularly, when a great amount of process gas is allowed to flow in order to increase the rate of the film formation, reaction byproducts which cannot be trapped by the trap apparatus, in some cases, escape to the down-stream side of the trap apparatus.

Further, in the conventional trap apparatuses, since the fins of a great number, are arranged at the same pitch, the fins are often blinded by the reaction byproducts adhered thereto. Therefore, reaction byproducts which cannot be trapped by the trap apparatus are made to flow to the down-stream of the flow.

As one solution to the above-described problem, it can be proposed to increase the capacity of the trap apparatus. However, if the capacity is simply increased, it is not possible to enhance the trapping efficiency for the increased capacity, but the space occupied by the apparatus is enlarged for nothing.

BRIEF SUMMARY OF THE INVENTION

The object of the invention is to provide an easy-maintenance compact trap apparatus capable of trapping reaction products at high efficiency without causing blinding of fins.

The object can be achieved by a trap apparatus having a structure including: a case provided for a gas exhaust system used for a film forming equipment which carries out a film forming process on an object; a gas supply port, made in the case and connected to an exhaust pipe of the gas exhaust system, for introducing an exhaust gas flowing through the exhaust pipe, into the case; a gas exhaust port, made in the case and connected to an exhaust pipe of the gas exhaust system, for exhausting the exhaust gas flowing through an inner space of the case, to the exhaust pipe; a plurality of partition plates arranged in the case so as to partition the inner space of the case into a plurality of rooms between the gas supply port and the gas exhaust port; a gas distribution port provided in some of the partition plates such that the exhaust gas introduced into the case through the gas supply port, is allowed to flow through the rooms partitioned by the partition plates, in the order, and then exhausted from the gas exhaust port; and a trap mechanism housed in each of the rooms, for trapping reaction byproducts contained in the exhaust gas introduced into the case through the gas supply port.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

DETAILED DESCRIPTION OF THE INVENTION

An embodiment of the present invention will now be described with reference to accompanying drawings.

Figure 1:
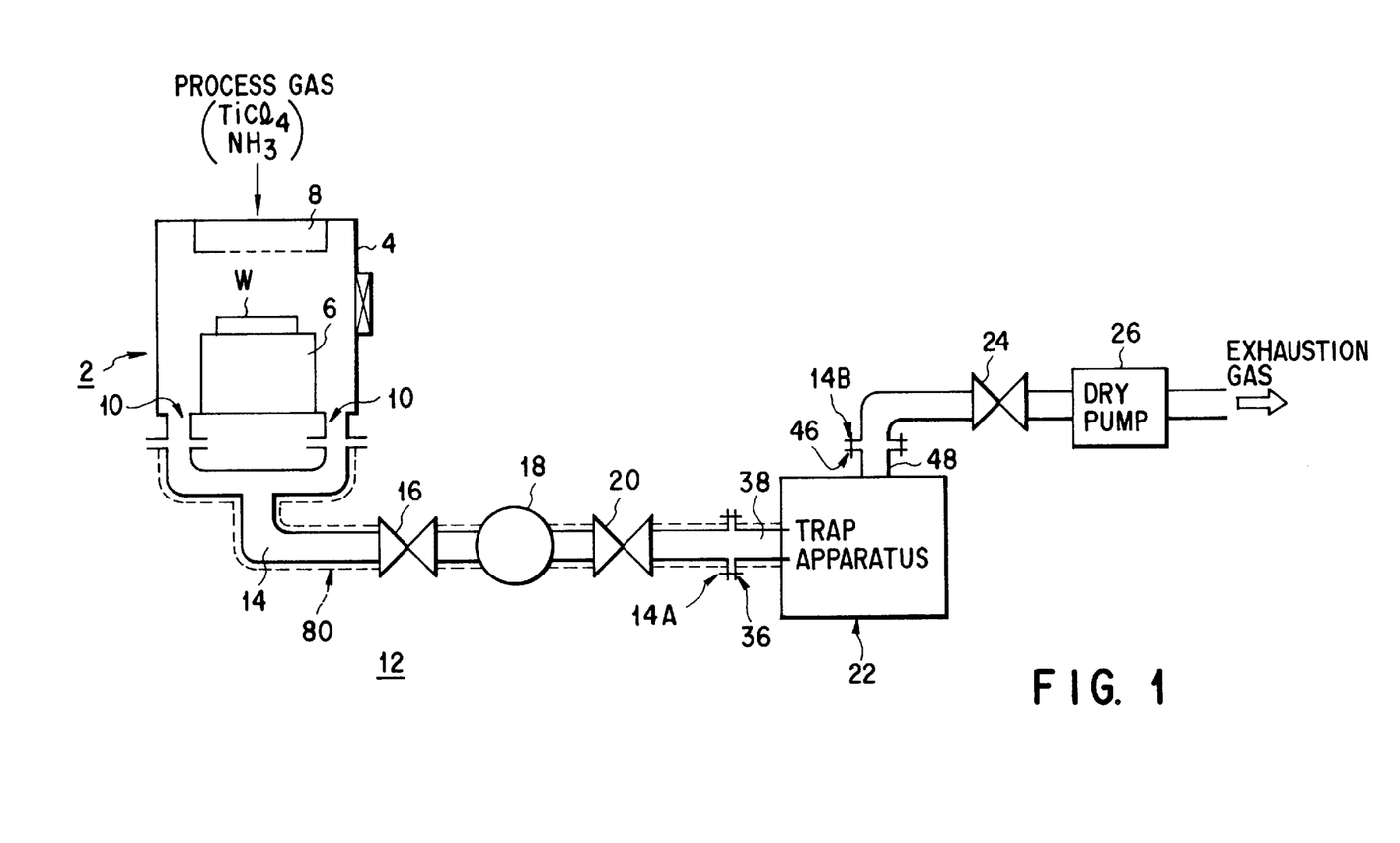
FIG. 1 is a diagram showing a gas exhaust system of a film forming equipment in which a trap apparatus according to an embodiment of the present invention is provided.

FIG. 1 shows a film forming equipment 2 and an gas exhaust system 12 used for the equipment 2. As can be seen in this figure, the film forming equipment 2 includes a process receptacle 4 made of, for example, aluminum. On the inner bottom section of the process receptacle 4, a susceptor 6 on which an object, for example, a semiconductor wafer W is to be placed, is provided. On the upper part of the process receptacle 4, a shower head 8 used for introducing the process gas into the process receptacle 4, is provided. In this embodiment, as examples of the process gas, $TiCl_4$ and $NH_3$ are used, and a film of TiN (titanium nitride) is formed on the surface of the semiconductor wafer W. Therefore, as reaction byproduct, $NH_4Cl$ (ammonium chloride) is generated, for example, which is in liquid state at room temperature, and gasified at 150° C., thought the characteristics vary depending upon the purity of the byproduct. Ammonium chloride generated is trapped by the trap apparatus of the embodiment.

In order to create a vacuum within the process receptacle 4, an gas exhaust system 12 is connected to an exhaust port 10 made in the bottom section of the process receptacle 4. The gas exhaust system 12 includes an exhaust path 14 made of, for example, stainless steel, connected to the exhaust port 10. In the exhaust path 14, a gate valve 16, a pump 18 such as a turbo molecular pump, a first open/close valve 20, a trap apparatus 22 according to the embodiment, a second open/close valve 24 and a dry pump 26 are arranged in the order from the upstream side to the down-stream. It should noted that the gas exhaust system 12 is in practice housed compactly in the vicinity of the film forming equipment 2, but it is illustrated in a developed manner in FIG. 1 so that its structure can be easily understood. Further, the position of the trap apparatus 22 is not limited to the position indicated in FIG. 1.

As can be seen in FIGS. 2 to 5, the trap apparatus 22 has a box-shaped case 28 made of, for example, aluminum. The case 28 has substantially a cubical shape with each side having about several tens of centimeters. The inner space of the case 28 is partitioned into four rooms 32A to 32D each having, for example, a rectangular parallelepiped shape, by four partition plates 30A to 30D arranged in a cross.

Figure 2:
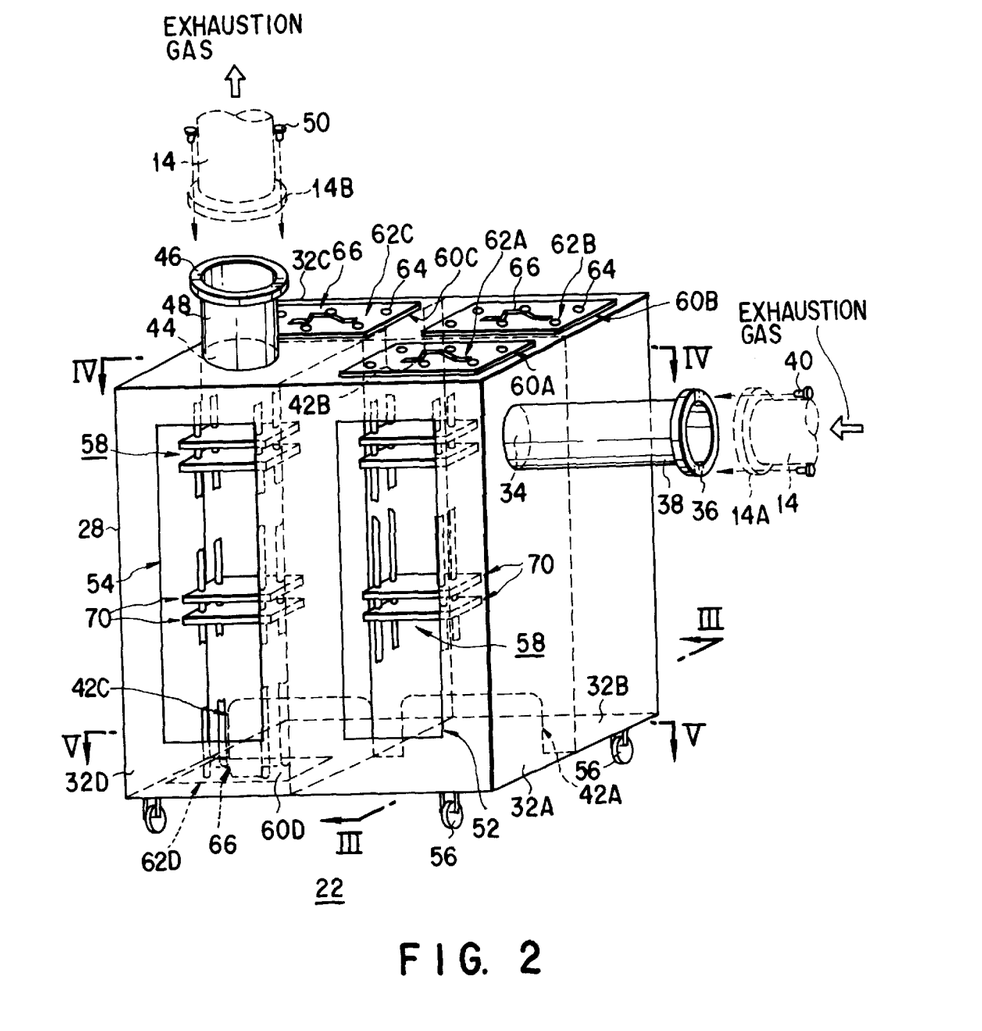
FIG. 2 is a perspective view showing the appearance of the trap apparatus according to the embodiment.
Figure 3:
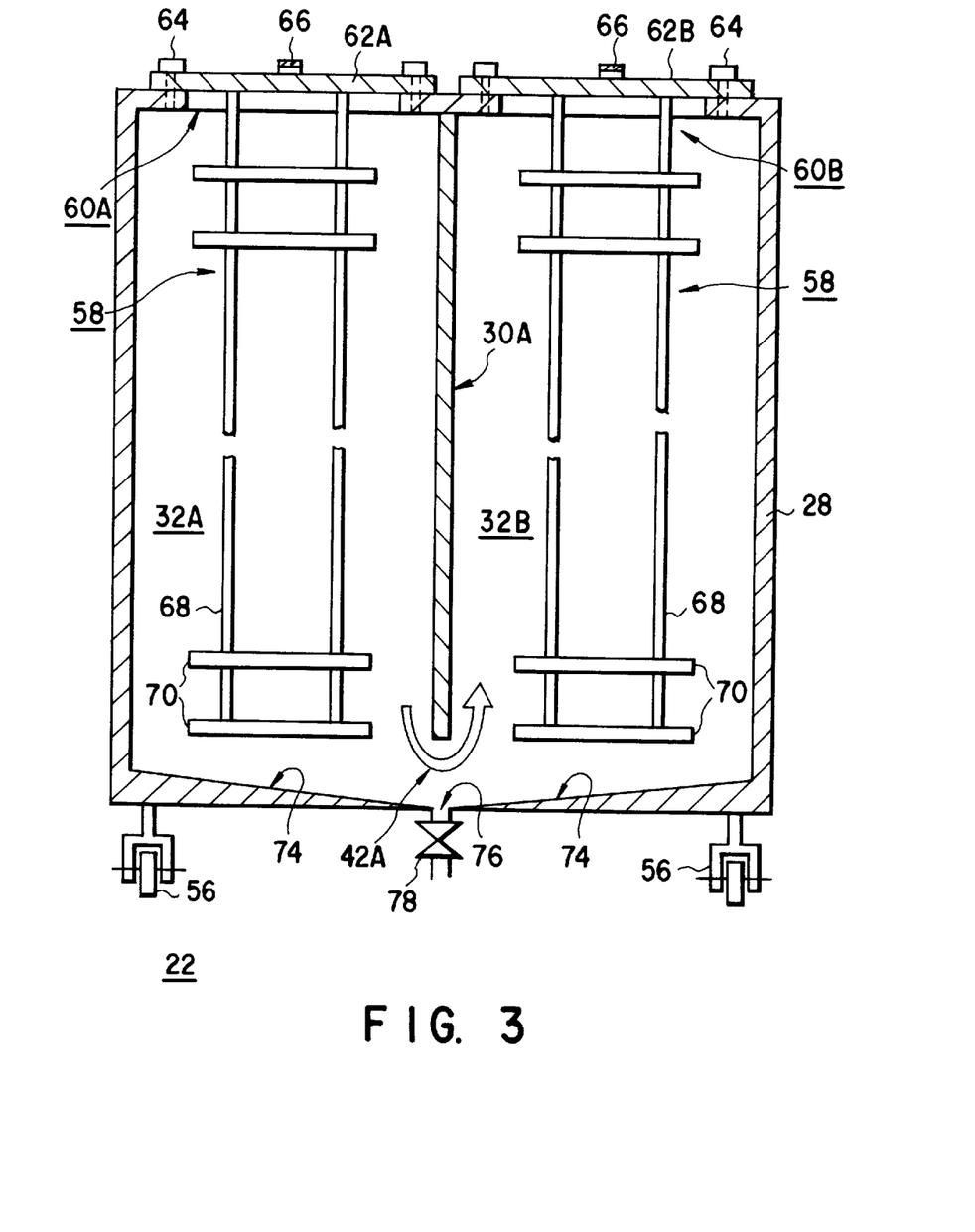
FIG. 3 is a cross sectional view taken along the line III—III in FIG. 2.
Figure 4:
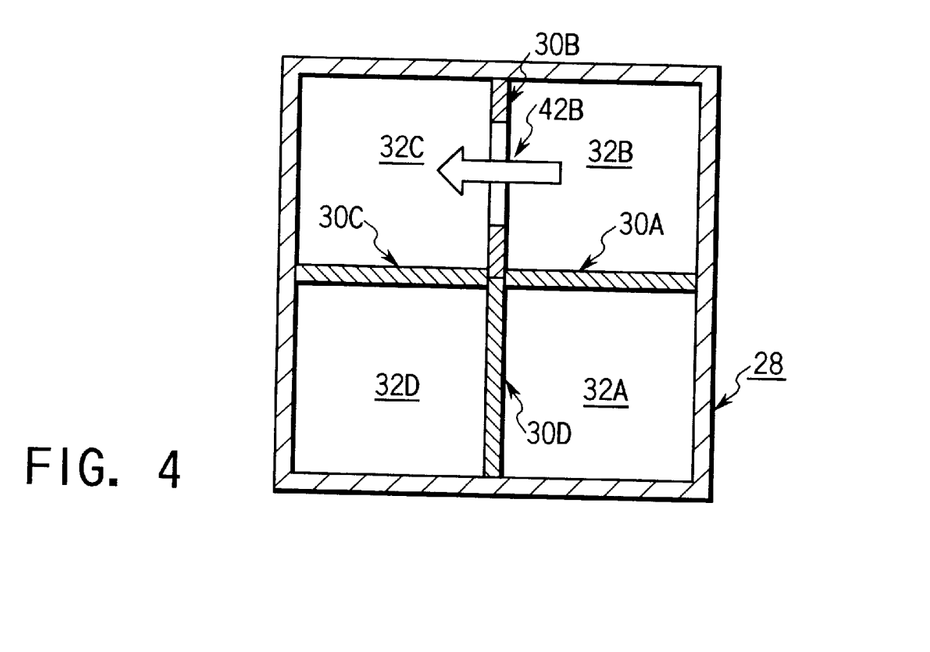
FIG. 4 is a cross sectional view taken along the line IV—IV in FIG. 2.
Figure 5:
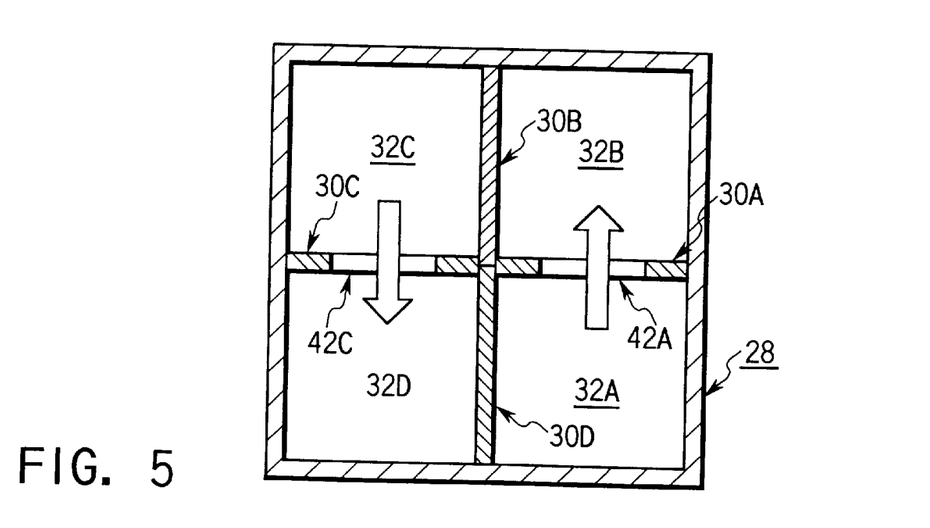
FIG. 5 is a cross sectional view taken along the line V—V in FIG. 2.

In the upper side wall of the first room 32A, a gas supply port 34 is made, and a connection pipe 38 having a flange 36 is connected to the gas supply port 34. A flange 14A of the exhaust path 14 is air-tightly connected to the flange 36 via a sealing material or the like (not shown), with bolts 40, such that the exhaust gas can be introduced to the connection pipe 38.

In the lower section of the partition plate 30A which is provided between the first room 32A and the second room 32B, a first gas distribution port 42A having a relatively large opening area, is made. With this structure, the exhaust gas introduced to the first room 32A via the gas supply port 34 is allowed to flow downwards in the first room 32A, and then introduced to the bottom section of the second room 32B via the first gas distribution port 42 (See FIG. 5).

In the upper section of the partition plate 30B which is provided between the second room 32B and the third room 32C, a second gas distribution port 42B having a relatively large opening area, is made. With this structure, the exhaust gas introduced to the second room 32B via the first gas distribution port 42A is allowed to flow upwards in the second room 32B, and then introduced to the upper section of the third room 32C via the second gas distribution port 42B (See FIG. 4).

In the lower section of the partition plate 30C which is provided between the third room 32C and the fourth room 32D, a third gas distribution port 42C having a relatively large opening area, is made. With this structure, the exhaust gas introduced to the third room 32C via the second gas distribution port 42B is allowed to flow downwards in the third room 32C, and then introduced to the bottom section of the fourth room 32D via the third gas distribution port 42C (See FIG. 5).

As shown in FIG. 2, a gas exhaust port 44 is made in the ceiling portion of the fourth room 32D. A connection pipe 48 having a flange 46 is connected to the gas exhaust port 44. A flange 14B of the exhaust path 14 is air-tightly connected to the flange 46 via a sealing material or the like (not shown), with bolts 50, such that the exhaust gas in the case 28 can be transferred to the down-stream side. It should be noted that the position of the gas exhaust port 44 may not be in the ceiling portion of the fourth room 32D, but it may be provided in the upper section of the side wall of the fourth room 32D.

In order to monitor the inner states of the first and fourth rooms 32A and 32D, monitor windows 52 and 54 made of, for example, glass, and having a shape elongated in the height direction, are provided in the side walls of the first and fourth rooms 32A and 32D, respectively. It is preferable that the monitor windows 52 and 54 should be provided for the side walls of the second and third rooms 32B and 32C as well. A plurality of casters 56 are provided on the bottom of the case 28 such that the whole apparatus can be easily carried.

In the ceiling portions of the first to third rooms 32A to 32C and in the bottom portion of the fourth room 32D, ports 60A to 60D used for loading/unloading a trap mechanism, explained later, are made. Each of the ports 60A to 60D is air-tightly closed via cover members 62A to 62D. The cover members 62A to 62D are detachably mounted on the ports 60A to 60D, respectively, with bolts 64. A handle 66 is provided for each of the covers 62A to 62D so as to facilitate the detachment of the covers 62A to 62D from the ports 60A to 60D. It should be noted that the covers 62A to 62D and the ports 60A to 60D should be provided on the side walls of the case 28.

In each of the first to fourth rooms 32A to 32D, trap mechanisms 58 for eliminating reaction byproducts contained in the exhaust gas, by trapping them, are housed. The trap mechanisms 58 are formed to have the same shape except that the area or diameter of air pits varies from one to another, as will be described later. Therefore, only the trap mechanism housed in the first room 32A will now be described.

Figure 6:
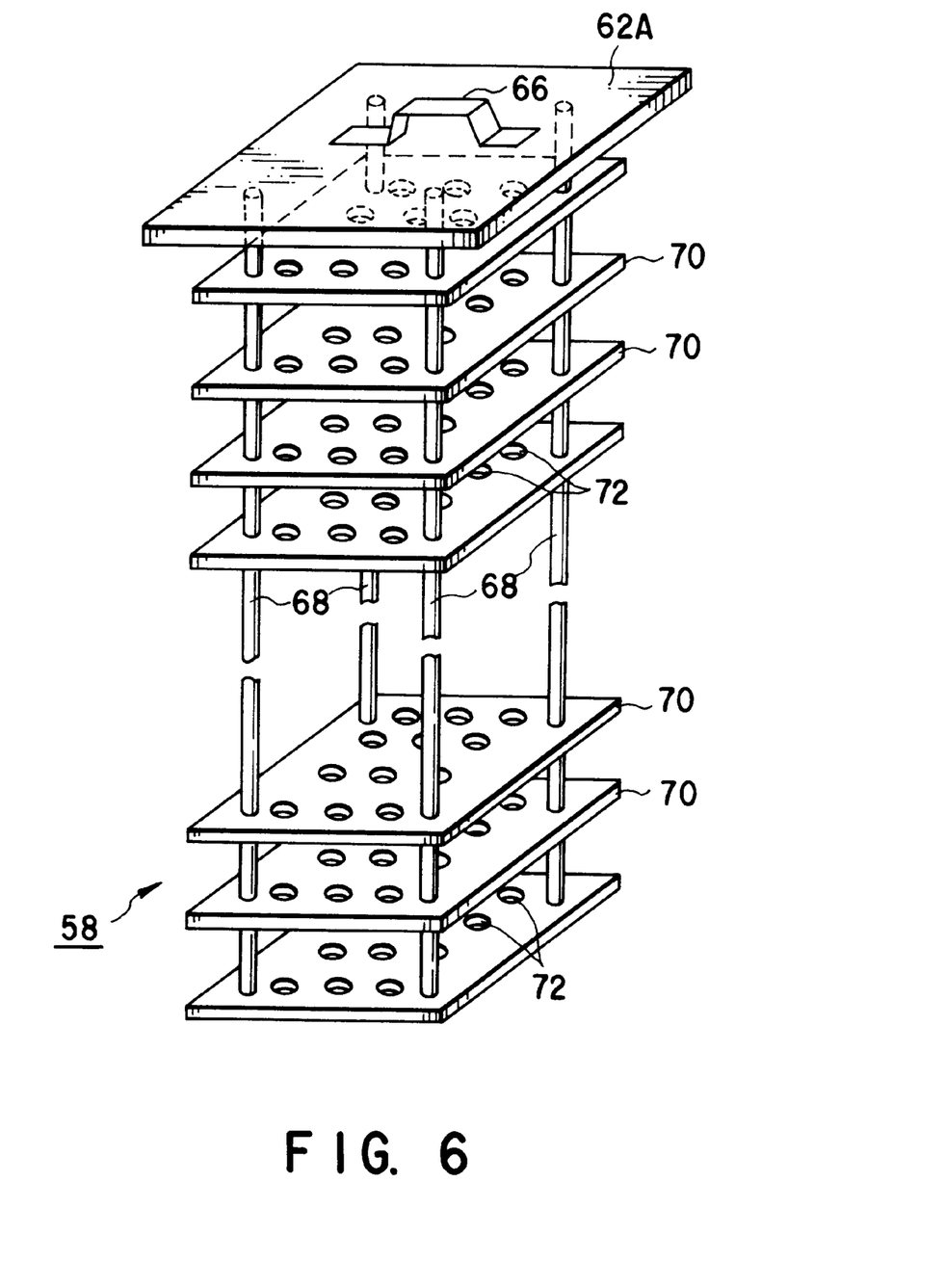
FIG. 6 is a perspective view of a trap mechanism of the trap apparatus.
Figure 7:
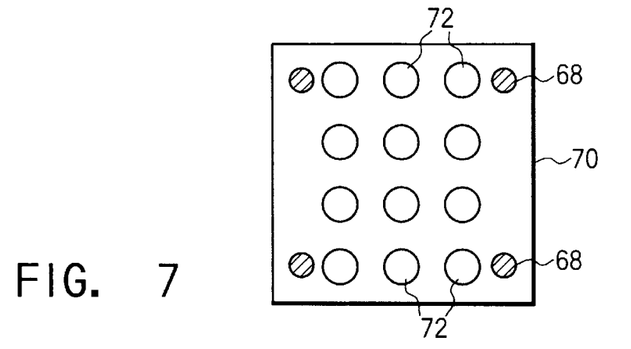
FIG. 7 is a plan view of a trap plate of the trap mechanism.

As can be seen in FIGS. 3 and 6, a trap mechanism 58 consists of four support 68, the upper ends of which are connected and fixed to the cover 62A, and rectangular-shaped trap plates 70 set and fixed to these support 68 at a predetermined pitch (for example, an interval of about 10 mm to 20 mm). The number of trap plates 70 mounted onto the support 68 is set to, for example, about twenty. It should be noted that the number of support 68 is not limited to four. As shown in FIGS. 6 and 7, each trap plate 70 has a great number of air pits 72 through which the exhaust gas passes. In this embodiment, the diameter of the air pits 72 is set to about 10 mm.

Figure 8:
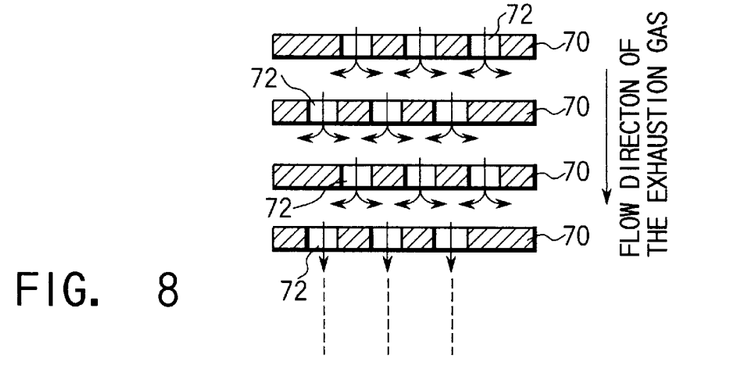
FIG. 8 is a cross sectional view showing the arrangement of air pits made in a trap plate.

In order to flow the exhaust gas in zigzag or staggering, trap plates 70 located adjacent to each other to be one above another, are arranged such that the air pits 72 of these plates 70 are located as can be seen in FIG. 8. With this arrangement, the air pits 72 of the plates 70 are arranged in zigzag with respect to the flow direction of the exhaust gas.

Therefore, a desired exhaust conductance can be obtained and the efficiency for trapping reaction byproducts can be enhanced.

Figure 9:
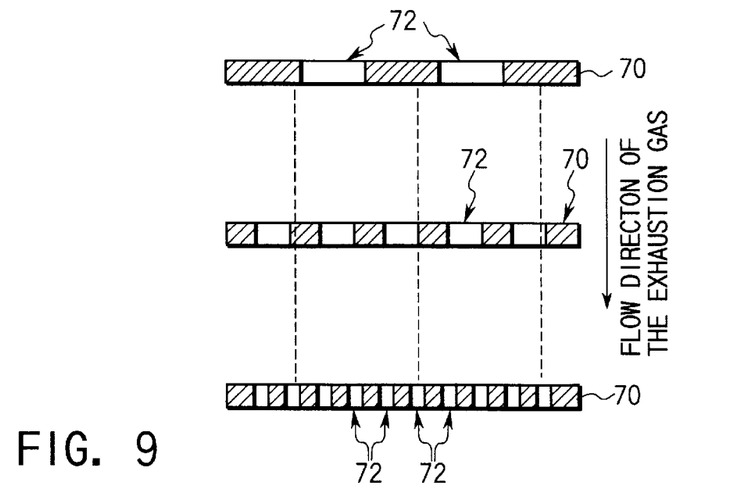
FIG. 9 is a cross sectional view showing the variation in size of the air pits made in a trap plate.

The opening areas of the air pits 72, to be more specific, the inner diameters thereof, made in these trap plates 70, are not uniform from one plate to another. As can be seen in FIG. 9, the diameters of the air pits 72 are made larger on the upstream side of the gas flow, and those on the downstream side are made smaller. That is, the inner diameters of the air pits 72 gradually or stepwise decrease as the gas flows to the downstream. It should be noted that in the embodiment, the total opening areas of the air pits 72 made in the trap plates 70 are set to be the same as each other. Therefore, in one trap plate 70, when the opening area of each air pit 72 is smaller, more air pits 72 are provided in that trap plate 70 than in other trap plate 70 having larger air pits. With this structure, the blinding of the air pits 72 is prevented on the upstream side of the gas flow, where the amount of reaction byproduct is larger, and reaction byproducts can be trapped at high precision on the downstream side of the gas flow, where the amount of byproduct is smaller.

The technique of varying the size of the air pits 72 between the upstream and downstream sides of the gas flow, can be applied not only to the trap plates 70 in each of the rooms 32A to 32D, but also to the trap plates 70 provided between the rooms 32A to 32D. More specifically, for example, the diameter of the air pits 72 made in the trap plate 70 located at the most upstream side (the lowermost side) in the second room 32B, is made to be the same as or less than the diameter of the air pits 72 of the trap plate 70 located on the most downstream side (the lowermost side) in the first room 32A. As a whole, in the first room 32A and the third room 32C, the diameter of the air pits 72 gradually decreases from an upper plate to a lower (along the direction of the gas flow), and in the second room 32B and the fourth room 32D, the diameter of the air pits 72 gradually decreases from a lower plate to an upper (along the direction of the gas flow). In this structure, the diameter of the air pits 72 made in the trap plate 70 located at the most upstream side (the uppermost side) in the first room 32A, is set to be largest, and the diameter of the air pits 72 of the trap plate 70 located on the most downstream side (the uppermost side) in the fourth room 32D is set to be smallest.

As can be seen in FIG. 3, a drain port 76 is made in the bottom portion of the case 28 at a site where the gas distribution port 42A (42C) of the partition plate 30A (30C) is located. The drain port 76 is connected to a liquid exhaust pipe (not shown) via an open/close valve 78. The inner wall 74 of the bottom of the case 28 is inclined downwards at a predetermined angle towards the drain port 76 such that, for example, a washing solution introduced into the case 28 is guided to the drain port 76 to be easily discarded therefrom. In FIG. 1, a heater 80 is provided for the section of the exhaust path 14, which is located between the exhaust port 10 and the trap apparatus 22. When the heater 80 is heated to, for example, about 150° C., the reaction byproducts flowing through the exhaust path 14 can be maintained in a vapor state.

The effect of the trap apparatus having the above-described structure will now be described.

First, as shown in FIG. 1, when a predetermined film forming process is carried out on a wafer W in the process receptacle 4 of the film forming equipment 2, reaction byproducts are mixed into the exhaust gas, which flows through the gas exhaust system 12. For example, in the case where $TiCl_4$ gas and $NH_3$ gas are used as process gases and a titanium nitride film is formed on a wafer W, ammonium chloride is created as a reaction byproduct. Since the section of the exhaust path 14, which continues up to the trap apparatus 22 is heated by the heater 80 to the vaporization temperature (for example, about 150° C.) of this reaction byproduct or higher, the reaction byproduct flows together with the exhaust gas into the trap apparatus 22 without being solidified.

Figure 10:
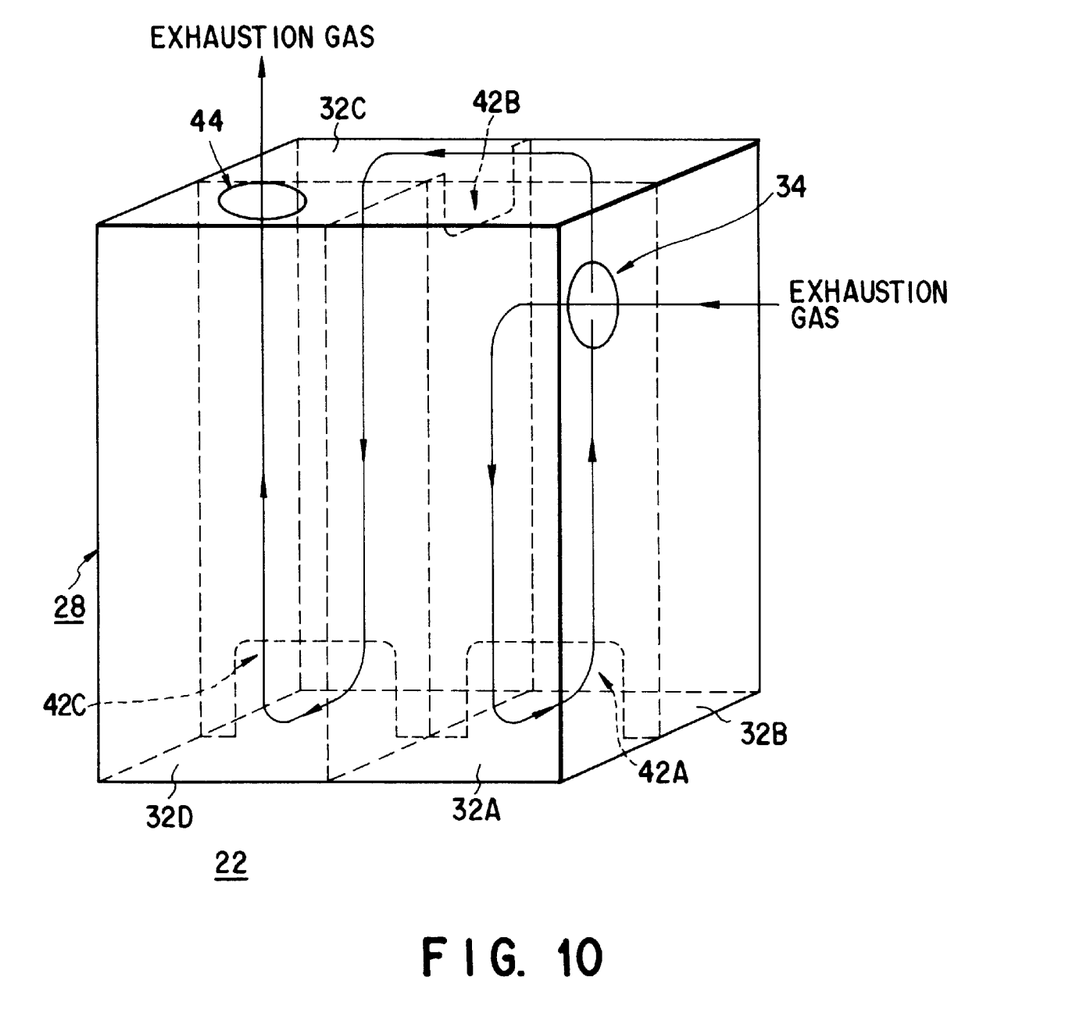
FIG. 10 is a perspective view illustrating the typical behavior of the exhaust gas flowing in the trap apparatus.

FIG. 10 is a diagram typically showing the flow of the exhaust gas in the trap apparatus 22. As can be seen in this figure, the exhaust gas which flows into the upper section of the first room 32A from the gas supply port 34, runs downwards in the room 32A, and further flows to the bottom section of the second room 32B through the first gas distribution port 42A. Then, the exhaust gas goes up within the room 32B, and flows into the upper section of the third room 32C through the second gas distribution port 42B, then goes down within the room 32C. Further, the exhaust gas flows into the bottom section of the fourth room 32D via the third distribution port 42C. After ascending in the room 32D, the gas is exhausted out of the case 28 through the gas exhaust port 44 located in the ceiling portion. During the above-described flow of the exhaust gas, the reaction byproduct is efficiently trapped by the trap mechanisms 58 provided in the rooms 32A to 32D, to be eliminated. More specifically, as shown in FIG. 8, the exhaust gas flows downwards to the downstream side as it passes through the air pits 72 of each of the trap plates 70. During this period, pieces of the reaction byproduct are condensed as they hit on the trap plates 70 set at room temperature, and adhered and trapped on the surface of each trap plate 70. Since the air pits 72 of the plates are arranged to be in zigzag from one plate to next, with respect to the gas flow direction, the exhaust gas does not flow straight, but flows in zigzag or meanders (see FIG. 8). With this structure, the possibility that pieces of the reaction byproduct are brought into contact with each trap plate 70 is increased, the efficiency for trapping the reaction byproduct is enhanced for the increased possibility. In addition to the zigzag arrangement of the air pits 72 formed between an upper one and an lower one of adjacent pair of trap plates 70, when the air pits are formed in a zigzag manner in each and every trap plate 70, the trapping efficiency is further improved.

According to the above-described embodiment, the inner space of the case 28 is divided into four rooms, and the exhaust gas flows from the first room 32A to the fourth room 32D in the order. With this structure, the gas flow path can be elongated without increasing the occupying space of the apparatus. Further, in the embodiment, the size of the air pits 72 is set larger in the upstream side of the gas flow, and it is designed to decrease gradually or stepwise as the plate is situated on the further downstream side. Consequently, even if a great amount of reaction byproduct is adhered to those of the trap plates 70, which are located on the upstream side, and tend to trap a more amount of byproduct, the blinding of the air pits 72 can be prevented since their sizes are set large on the upstream side. Further, although the amount of byproduct adhered to those of the trap plates 70, situated on the downstream side should become smaller, the possibility of trapping byproduct can be maintained high as compared to the case of the upstream side, since the size of the air pits 72 is set smaller on the downstream side. With this structure, it becomes possible to maintain the efficiency of trapping reaction byproduct at high while preventing the blinding of the trap mechanism in the entire apparatus.

The amount of reaction byproduct adhered to the trap plates 70 can be monitored through the monitoring windows 52 and 54 made in the side surface of the case 28. When a great amount of reaction byproduct is trapped, the trap apparatus 22 is removed and subjected to the maintenance operation including cleaning. The trap apparatus 22 can be removed as follows. That is, first, after a film forming process is completed, the first and second open/close valves 20 and 24 (see FIG. 1) are closed so as to isolate the trap apparatus 22. Then, the bolts 40 and 50 which fix the flanges 36 and 46 of the connection pipes 38 and 48, are loosened and pulled up, and thus the trap apparatus 22 is removed from the exhaust path 14. In the case where the amount of reaction byproduct trapped is not very much, the case 28 is filled with, for example, a washing solution serving as a solvent, and the whole apparatus is shaken, so as to dissolve and remove the reaction byproduct adhered to the trap plates 70 into the solution. In the case where the amount of the reaction product trapped is so much that it cannot be easily removed by the above-described simple cleaning operation, the covers 62A to 62D provided on the ceiling or bottom portions of the rooms 32A to 32D are taken off by loosening the bolt 64. Then, the trap mechanisms 58 formed to be integrated with the covers 62A to 62D are taken out of the case 28. In the case where the covers 62A to 62D are not connected to the trap mechanisms 58 as integral bodies, the covers 62A to 62D are taken off, and then the trap mechanisms 58 housed in the rooms are removed by hands. After the trap mechanisms 58 are removed from the case 28, the reaction byproduct trapped is washed off, for example, by immersing trap mechanisms 59 into a washing solution. At the same time, reaction byproduct adhered onto the inner surface and the like, of the case 28, is washed off with washing solution.

Regarding the discard of the washing solution from the case 28, most of the washing solution can be discarded from the connection tubes 38 and 48, or discarded from ports 64A to 64D when the covers are off; however, it is difficult to eliminate the washing solution remaining in the case 28 completely in a short time. However, in this embodiment, the inner walls 74 of the bottom section of the case 28 is formed to have a tapered surface as can be seen in FIG. 3, and therefore the washing solution remaining in the case 28 flows down along the tapered surface into the drain port 76. Consequently, when the drain open/close valves 78 are opened, the remaining solution can be easily discarded. With the described structure, even if the flow path of the exhaust gas in the trap apparatus is elongated, each trap mechanism 58 can be taken out easily from the case 28, thus making it possible to facilitate the maintenance operation.

Figure 11:
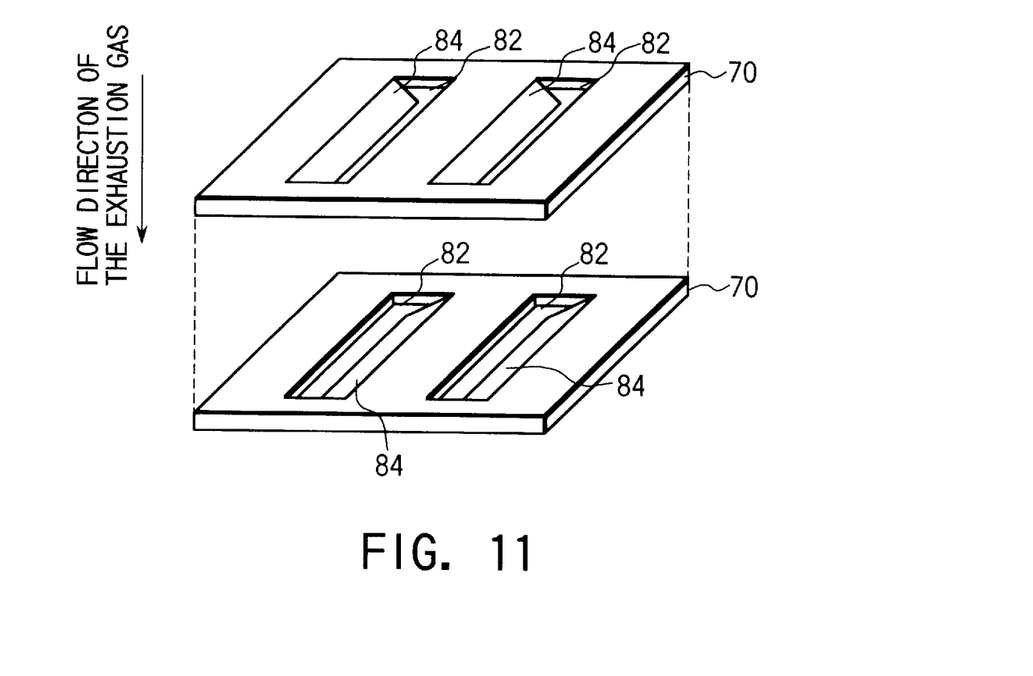
FIG. 11 is a perspective view showing another version of the trap plate.

In the meantime, the number of trap plates 70, the pitch of the plates arranged, the size of air pits 72, and the like are set appropriately in consideration of the amount, characteristics and the like, of reaction byproduct to be trapped. In this embodiment, the trap mechanisms 58 employ trap plates 70 in which air pits 72 of an elliptical or circular shape are made; however the structure of the trap mechanisms is not limited to this. Alternatively, for example, as shown in FIG. 11, it is possible that rectangular cuts are made in trap plates 70, and the cut sections are bent at a predetermined angle towards the exhaust gas flow direction, thus forming rectangular air pits 82 and fins 84. In this structure, not only the air pits 82 should be arranged in zigzag between plates with respect to the exhaust gas flow direction, but also the fins 84 should be arranged such that the inclining directions thereof between plates are reverse to each other with respect to the gas flow direction. Thus, the efficiency of trapping reaction byproduct can be maintained at high.

Further, as a trap mechanism, a conventionally employed type, for example, one having a great number of fins, can be also used.

Figure 12:
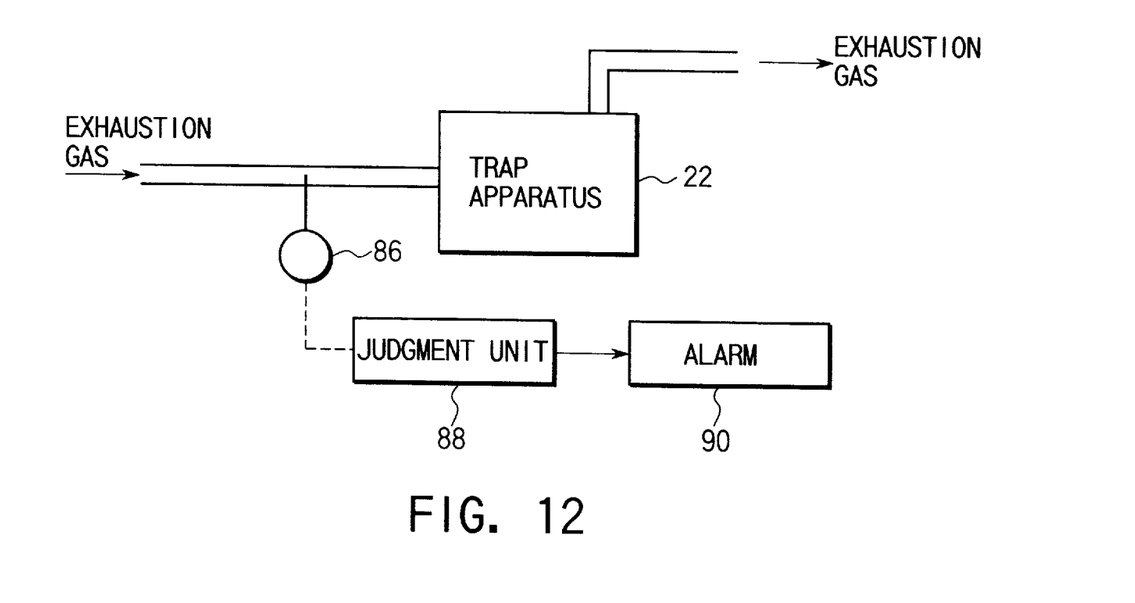
FIG. 12 is a diagram showing the arrangement of circuits, designed to automatically notify the maintenance timing for the trap apparatus.

In the above embodiment, the state of the trap mechanism to which byproduct is adhered, is monitored by the operator through the monitor windows, and the timing of the cleaning is decided; however it may be automatically carried out. In this case, for example, as can be seen in FIG. 12, a flow meter 86 is provided for a section of the exhaust path 14, which is located on either the upstream or downstream of the trap apparatus 22 (in this figure, it is provided on the upstream side), and a flow amount value detected by the flow meter is compared with a predetermined threshold value at a judgment unit 88 of a microcomputer or the like, so as to decide if a maintenance is necessary or not. For example, when a certain amount or more of reaction byproduct is trapped, the exhaust conductance becomes large, and therefore the flow amount of the exhaust gas is decreased. When the flow amount becomes equal to or lower than the threshold value, an alarm 90 is operated to notify the operator that a maintenance is necessary. Or, in place of the flow meter 86, a manometer may be provided. When a manometer is placed on the upstream side of the trap apparatus 22, the pressure increases when a certain amount or more of reaction byproduct is trapped, and therefore its threshold should be detected. When it is placed on the downstream side, a reverse phenomenon occurs, and therefore the decrease in pressure should be detected.

As described above, according to the trap apparatus of the present invention, the excellent operational effects can be obtained as will now be summarized. That is, the exhaust gas introduced into the case passes through all the rooms in the order via the gas distribution port made in the partition plates, and during this period, reaction byproduct contained the exhaust gas is trapped with the trap mechanisms provided in the rooms, to be eliminated. With this structure, the exhaust gas flows through these rooms one after another in the order, and therefore the length of the gas flow path can be increased. Consequently, the efficiency for trapping reaction byproduct can be enhanced. More specifically, the inner space of the case is partitioned into a plurality of rooms, in each of which, a trap mechanism is provided, and the exhaust gas is allowed to flow from one room to another in the order. Therefore, the flow path can be elongated while maintaining the size of the apparatus compact, and the reaction byproduct contained in the exhaust gas can be efficiently eliminated.

Moreover, in each of the trap mechanisms, trap plates each having air pits, are arranged at a certain pitch, making it possible to achieve a simple structure and suppressing the occurrence of the blinding of the plates or the like. Further, the air pits are arranged in zigzag between plates, with respect to the exhaust gas flow direction, and with this arrangement, the exhaust gas flows in zigzag or meanders. Consequently, the possibility that the exhaust gas hits each trap plate, increases. Thus, the reaction byproduct can be efficiently trapped. Furthermore, the opening area of air pits is gradually decreased as the exhaust gas flows downstream. With this structure, the occurrence of the blinding can be further suppressed, and the efficiency of trapping the reaction byproduct can be further enhanced. In other words, the opening area of the air pits located on the upstream side of the exhaust gas flow, where the trapping amount is greater, is set relatively larger, so as to prevent the blinding of these holes, and the reaction byproduct remaining the downstream of the gas flow can be efficiently trapped since the opening area of one air pit is smaller in the downstream side. Furthermore, with the structure that a trap mechanism and a cover are formed as an integral unit, the trap mechanism can be very easily loaded or unloaded by removing the cover which comes out together with the trap mechanism for a maintenance operation, thus facilitating the maintenance operation. Furthermore, the monitor window is provided in one wall of the case so that the inside of the case can be monitored, and therefore the amount of the reaction byproduct trapped can be detected so as to know an appropriate maintenance timing. Furthermore, the drain port is made in the case, and the inner walls of the case are formed into a tapered surface which continue towards the drain port, and therefore the washing solution after washing the inner space of the case, can be made to flow on the tapered surface and discarded from the drain port quickly. Thus, the maintenance operation can be efficiently carried out.

In the above-described embodiment, the inner space of the case is partitioned into four rooms in the vertical direction; however the number of rooms is not limited to this, or the inner space of the case can be partitioned in a lateral direction. Or, in the embodiment, the reaction byproduct is trapped with trap plates which are set at room temperature; however it is possible that a coolant pipe in which a coolant flows is provided for each trap plate so as to cool it and promote the condensation of the reaction byproduct in a vapor state, and the byproduct is trapped in a condensate form. Or, the embodiment was described in connection with the example case where ammonium nitride is eliminated as its reaction byproduct; however the present invention is not limited to this, but it can be applied to any other case as long as the reaction byproduct becomes condensate at room temperature or less. Lastly, the embodiment was described as a case where a film forming process is carried out on a semiconductor wafer; however the present invention is not limited to this, but it can be applied to LCD substrates, glass substrates and the like.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. A trap apparatus comprising:
   a case provided for a gas exhaust system used for a film forming equipment which carries out a film forming process on an object;
   a gas supply port, made in the case and connected to an exhaust pipe of the gas exhaust system, for introducing an exhaust gas flowing though the exhaust pipe, into the case;
   a gas exhaust port, made in the case and connected to an exhaust pipe of the gas exhaust system, for exhausting the exhaust gas flowing through an inner space of the case, to the exhaust pipe;
   a plurality of partition plates arranged in the case so as to partition the inner space of the case into a plurality of rooms between the gas supply port and the gas exhaust port;
   a gas distribution port provided in some of the partition plates such that the exhaust gas introduced into the case through the gas supply port, is allowed to flow through the rooms partitioned by the partition plates, in the order, and then exhausted from the gas exhaust port;
   a trap mechanism housed in each of the rooms, for trapping reaction byproducts contained in the exhaust gas introduced into the case through the gas supply port; and
   a plurality of trap plates for trapping reaction byproduct contained in the exhaust gas, and holding means for holding said trap plates at a predetermined pitch.

2. A trap apparatus according to claim 1, wherein each of the trap plates has a plurality of air pits made therein.

3. A trap apparatus according to claim 2, wherein the plurality of air pits made in the trap plates are arranged in zigzag with respect to the flow direction of the exhaust gas, between plates.

4. A trap apparatus according to claim 2, wherein opening area of the plurality of air pits is decreased continuously or stepwise as the exhaust gas flows downstream.

5. A trap apparatus according to claim 2, wherein a total opening area of the plurality of air pits is set to be equal between all the trap plates.

6. A trap apparatus according to claim 1, wherein a port is made in the case so as to load/unload the trap mechanism, and a cover is detachably mounted on the port.

7. A trap apparatus according to claim 6, wherein the trap mechanism is connected to the cover as an integral form.

8. A trap apparatus according to claim 1, wherein a window is provided for the case, and insides of the rooms can be monitored through the window.

9. A trap apparatus according to claim 1, wherein the case has a drain port for discarding a liquid introduced to the case, opening/closing means for opening/closing the drain port and guide means for guiding the liquid attached to an inner wall of the case to the drain port.

10. A trap apparatus according to claim 9, wherein the guide means is an inclined surface formed in the inner wall of the case, for guiding the liquid towards the drain port.

* * * * *